W. H. HARRISON.
SECTIONAL-WHEEL.
No. 173,948. Patented Feb. 22, 1876.
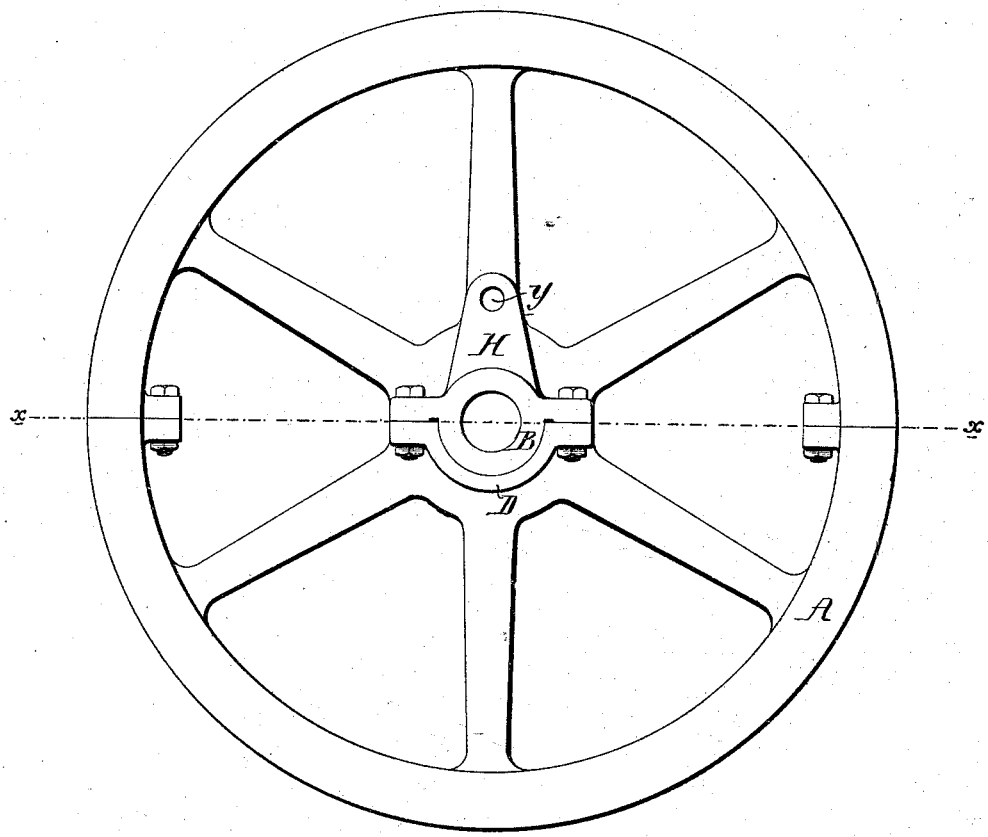
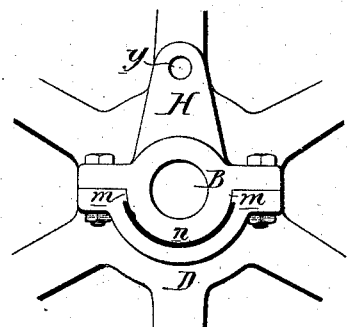
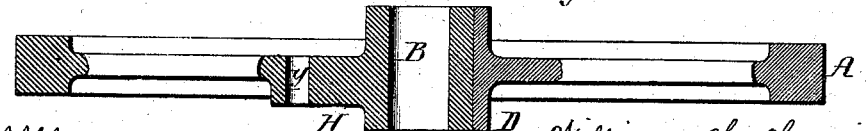
Witnesses
Harry Howson Jr
Harry Smith
William H. Harrison
by his Attorneys,
Howson and Son

UNITED STATES PATENT OFFICE.

WILLIAM H. HARRISON, OF NEWCASTLE, PENNSYLVANIA.

IMPROVEMENT IN SECTIONAL WHEELS.

Specification forming part of Letters Patent No. 173,948, dated February 22, 1876; application filed February 14, 1876.

*To all whom it may concern:*

Be it known that I, WILLIAM HENRY HARRISON, of Newcastle, Lawrence county, Pennsylvania, have invented certain Improvements in Sectional Wheels, of which the following is a specification:

My invention relates to improvements in the manufacture of fly-wheels, large gear-wheels, or pulleys; and the main object of my improvement is to make a two-part wheel or pulley which can be more easily and accurately bored than those of the usual construction.

It is a common practice in constructing steam-engines and machinery generally to make the fly-wheels and gear-wheels and pulleys of the larger class in two parts, thereby reducing the weight and size of the castings for convenient handling and shipment, and for the further object of obviating the undue strains caused by the unequal contraction of large castings during the cooling of the same.

The usual plan has been to divide the wheel or pulley into two equal parts, the line of division passing through the hub, and the two parts being bolted together at the rim and hub. This plan involves the necessity of securing the two parts together before the hub can be bored, and the entire wheel is a cumbersome object to handle and adjust for boring and fitting. The bolts, too, by which the two-part hubs are secured are apt to yield when the wheel is adjusted to the shaft and the keys are driven.

In order to obviate these difficulties, I construct the two-part wheel in the manner shown in the accompany drawing, in which—

Figure 1 is a side view; Fig. 2, a modification of part of the wheel, and Fig. 3, a transverse section.

The rim A of the wheel is divided on a line, $x\,x$, passing through the center, and is secured by bolts passing through lugs in the usual manner. The hub B, instead of being parted on the same line as usual, is made continuous, and this continuous hub forms a part of one half of the wheel, while the other part has a segmental or false hub, D, adapted to the continuous hub of the other half, the two halves being bolted together in a manner too clearly shown in Fig. 1 to need explanation.

It is not essential that the segmental hub should fit snugly throughout to the continuous hub. It may, for instance, fit snugly at the points $m\,m$, the segmental space $n$ being packed with suitable cement after the two parts of the wheel have been permanently secured together.

It will be evident that the continuous hub of the wheel can be accurately bored without securing the two parts of the wheel together, and that the hub cannot yield on driving the keys which secure it to the shaft.

The advantage of my invention becomes more prominent when applied to the fly-wheel, shown in Fig. 1, which has a crank, H, forming a part of that half of the wheel which has the continuous hub, for, after this portion of the wheel has been adjusted to the bed of a boring-machine and its hub has been bored, it can be readily adjusted for the boring of the hole $y$ of the crank-pin, which must necessarily be parallel with the hole in the hub.

That my invention may be adopted with advantage in the construction of two-part gear-wheels and pulleys will be too obvious to need explanation.

I claim as my invention—

1. The combination, in two-part wheels, of a continuous hub, B, on one part, with the segmental or false hub D on the other part, substantially in the manner described.

2. The combination, in a two-part crank-wheel, of the continuous hub B and crank H on one half, with the segmental hub D on the other half of the wheel.

In testimony whereof I have signed my name to this specification in the presence of two subscribing witnesses.

WILLIAM H. HARRISON.

Witnesses:
GEO. W. VEACH,
A. L. HAZEN.